(12) United States Patent
Katsumata et al.

(10) Patent No.: US 11,441,664 B2
(45) Date of Patent: Sep. 13, 2022

(54) CAM DEVICE

(71) Applicant: SANKYO SEISAKUSHO CO., Tokyo (JP)

(72) Inventors: Kazuhisa Katsumata, Kikugawa (JP); Naoyuki Takahashi, Kikugawa (JP)

(73) Assignee: SANKYO SEISAKUSHO CO., Tokyo (JP)

( * ) Notice: Subject to any disclaimer, the term of this patent is extended or adjusted under 35 U.S.C. 154(b) by 0 days.

(21) Appl. No.: 16/966,601

(22) PCT Filed: Dec. 28, 2018

(86) PCT No.: PCT/JP2018/048480
§ 371 (c)(1),
(2) Date: Jul. 31, 2020

(87) PCT Pub. No.: WO2019/150881
PCT Pub. Date: Aug. 8, 2019

(65) Prior Publication Data
US 2021/0079994 A1 Mar. 18, 2021

(30) Foreign Application Priority Data
Jan. 31, 2018 (JP) .............................. JP2018-014320

(51) Int. Cl.
*F16H 55/10* (2006.01)
*F16C 19/36* (2006.01)
(Continued)

(52) U.S. Cl.
CPC ............. *F16H 55/10* (2013.01); *F16C 19/36* (2013.01); *F16C 19/381* (2013.01); *F16C 19/54* (2013.01);
(Continued)

(58) Field of Classification Search
CPC . F16H 55/10; F16H 53/06; F16H 1/16; F16H 25/06; F16H 57/021; F16C 19/381;
(Continued)

(56) References Cited

U.S. PATENT DOCUMENTS 3,589,202 A * 6/1971 Stanley .................. F16H 19/025
74/25
7,603,930 B2 * 10/2009 Kato ..................... B23Q 16/025
74/813 R
(Continued)

FOREIGN PATENT DOCUMENTS

DE 102004040340 A1 * 2/2006 ............ F16C 33/588
DE 102013218434 A1 2/2015
(Continued)

OTHER PUBLICATIONS

Define a row, Google Search, Aug. 21, 2021 (Year: 2021).*
(Continued)

*Primary Examiner* — Ninh Luong
(74) *Attorney, Agent, or Firm* — Harness, Dickey & Pierce, P.L.C.

(57) ABSTRACT

A bearing rotatably supported by a housing. The bearing having one radial and two axial parts all including a plurality of rolling elements. The rolling elements of the radial bearing part contact an outer peripheral surface of an output shaft. The rolling elements of one or two of the axial bearing parts contact the outer peripheral surface of the output shaft. The rolling elements of the other axial bearing part contact a first ring-shaped part fixed to the output shaft to form an output-shaft side raceway surface. The rolling elements of the radial bearing part and of the two axial bearing parts contact the surface of a second ring-shaped part disposed on the output shaft, or the rolling elements of the radial bearing part and of one of the axial bearing parts directly contacts the
(Continued)

inner surface of the housing to form an outer raceway surface.

4 Claims, 8 Drawing Sheets

(51) Int. Cl.
  *F16C 19/54* (2006.01)
  *F16H 1/16* (2006.01)
  *F16H 25/06* (2006.01)
  *F16C 19/38* (2006.01)
  *F16H 53/06* (2006.01)

(52) U.S. Cl.
  CPC ............... *F16H 1/16* (2013.01); *F16H 25/06* (2013.01); *F16H 53/06* (2013.01)

(58) Field of Classification Search
  CPC ........ F16C 19/36; F16C 19/54; F16C 19/545; F16C 19/26
  See application file for complete search history.

(56) References Cited

U.S. PATENT DOCUMENTS

| | | | | |
|---|---|---|---|---|
| 9,683,653 | B2 * | 6/2017 | Wu | ......................... F16H 1/166 |
| 10,563,698 | B2 * | 2/2020 | Tomsa | ................ F16C 33/7886 |
| 2002/0048420 | A1 * | 4/2002 | Kato | ..................... F16C 19/362 |
| | | | | 384/618 |
| 2004/0146369 | A1 * | 7/2004 | Kato | ..................... B23Q 16/065 |
| | | | | 409/219 |
| 2014/0304992 | A1 | 10/2014 | Capoldi et al. | |
| 2016/0160984 | A1 * | 6/2016 | Gratzer | ................... F16C 19/48 |
| | | | | 74/423 |

FOREIGN PATENT DOCUMENTS

| | | | | |
|---|---|---|---|---|
| JP | H04290641 A | 10/1992 | | |
| JP | 2001287138 A | 10/2001 | | |
| JP | 4834216 B2 | 12/2011 | | |
| JP | 2014070719 A | 4/2014 | | |
| JP | 2014085020 A | 5/2014 | | |
| JP | JP-2014514511 A | 6/2014 | | |
| JP | 6047999 B2 * | 12/2016 | ............ F16C 19/381 | |
| JP | 2016200213 A | 12/2016 | | |
| JP | 2017089663 A | 5/2017 | | |
| WO | WO 2008104434 A1 * | 9/2008 | .............. F16C 19/30 | |
| WO | WO 2012062642 A1 * | 5/2012 | .............. F16C 19/54 | |
| WO | WO 2017059857 A1 * | 4/2017 | .............. F16C 19/38 | |
| WO | WO 2021090551 A1 * | 5/2021 | ............... B23Q 1/52 | |

OTHER PUBLICATIONS

International Search Report (in English and Japanese) and Written Opinion of the International Searching Authority (in Japanese) issued in PCT/JP2018/048480, dated Apr. 9, 2019; ISA/JP.

Extended European Search Report dated Aug. 31, 2021 in corresponding European Application No. 18904454.8.

* cited by examiner (A)

SECTION A-A (B)

SECTION B-B

CAM DEVICE

CROSS REFERENCE TO RELATED APPLICATIONS

This application is a U.S. National Phase Application under 35 U.S.C. 371 of International Application No. PCT/JP2018/048480 filed on Dec. 28, 2018, which claims the benefit of priority from Japanese Patent Application No. 2018-014320 filed Jan. 31, 2018. The entire disclosures of all of the above applications are incorporated herein by reference.

TECHNICAL FIELD

The present invention relates to a structure of a bearing that supports an output shaft in a cam device using a roller gear cam mechanism as a power transmission element to rotate the output shaft.

BACKGROUND ART

A roller gear cam mechanism include a screw-shaped cam 10 that serves as an input shaft and an output shaft (turret) 30 provided with a roller follower 20 and disposed so as to perpendicularly intersect the input shaft, as illustrated in FIG. 1. For example, Patent Literature 1 discloses a roller gear cam mechanism that does not cause backlash and has high rigidity and high transmission efficiency. A cam device can be obtained by rotatably supporting an input shaft of the roller gear cam mechanism and an output shaft at a housing using a bearing.

Although an improvement in performance is achieved mainly by contriving the cam shape and disposition of the roller follower in Patent Literature 1, the performance of the cam device using the roller gear cam mechanism as a power transmission element to rotate the output shaft significantly depends on the structure of the bearing that supports the input shaft and the output shaft and the method for attaching the bearing. As the bearing, a bearing of a different type is selected depending on required properties in each case. As an example of the bearing selected in the related art, Patent Literature 2 discloses a bearing adapted such that no special machining is conducted on an output shaft and the output shaft is configured as an element that is completely independent of a bearing for the output shaft secured to a housing. However, there are disadvantages that the output shaft eccentrically rotates since the rotation centers of the output shaft and the bearing do not completely coincide with each other and this adversely affects rotation precision, positioning precision, and the like, and that the entire cam device increases in size. On the other hand, Patent Literature 3 discloses a cam device with a structure in which an output shaft and a bearing are further integrated in order to achieve a decrease in size of the cam device and high precision of rotation.

Satisfactory rotation precision and high rigidity are required at the same time for the bearing of the output shaft for the purpose of achieving high precision of rotation and a decrease in size. In another example of a cam device in the related art illustrated in FIG. 2, required performance is obtained by employing a three-row structure as a combination of one radial bearing part 61 and two axial bearing parts 62 and 63. A clearance of each of the axial and radial bearings is adjusted such that preloading is applied, and for assembling each of the bearings, an inner ring 41 and a bearing ring 42 of the axial bearing parts are secured to an output shaft 30, and an outer ring 50 is secured to a first housing 71, with a plurality of bolts 81 and 82 concentrically disposed around the output shaft 30, respectively. Also, the output shaft 30 is secured to a housing 70 via seals 83 and 84, and in this manner, a lubricant in the housing is sealed.

CITATION LIST

PATENT LITERATURE 1: JP-A-2017-089663
PATENT LITERATURE 2: JP-A-2001-287138
PATENT LITERATURE 3: Japanese Patent No. 4834216

SUMMARY OF INVENTION

Technical Problem

In FIG. 2, the inner ring 41 with an L-shaped section has the output-shaft side raceway surface of the first axial bearing part 62 and the output-shaft side raceway surface of the radial bearing part 61, and an inner diameter surface 43 thereof is fitted to the output shaft. The inner ring 41 is secured to the output shaft 30 along with the axial bearing ring 42, with which the second axial bearing part 63 that is the other one of the axial bearing parts is brought into contact, with a plurality of bolts 81 together. Therefore, a plurality of bolt insertion through-holes 85 are opened in the inner ring 41, and the through-holes 85 of the inner ring 41 are located in the vicinity of the output-shaft side raceway surface 31 of the radial bearing part 61 as illustrated in (A) of FIG. 3. Therefore, the thickness from the inner diameter surface 43 of the inner ring 41 to the output-shaft side raceway surface 31 of the inner ring 41, with which the radial bearing part 61 is brought into contact, at portions where the through-holes 85 are provided is smaller than the other part by the amount corresponding to the clearance around the bolts 81, and the inner ring does not have a uniform thickness over the entire periphery thereof. As a result, the shape of the output-shaft side raceway surface 31 of the inner ring 41, which is a true circle when no load is applied, is changed into a polygonal shape in accordance with the number of bolt insertion through-holes when a load is applied, namely during preloading or during application a radial load to the radial bearing part 61. The degradation of roundness adversely affects rotation of the output shaft, and there are problems that rotation precision is degraded, that variations in rotation torque occur and prevent an improvement in efficiency, and that vibrations and noise are caused.

Although it is possible to solve the problem that the roundness of the raceway surface of the inner ring is degraded by setting the distance between the raceway surface 31 of the inner ring and the bolt holes 85 to be sufficiently long to such an extent that the roundness is not affected during preloading, this may cause another problem that the dimension of the housing increases.

Further, the related art has a problem that machining errors and assembly errors of the housing 70, the output shaft 30, and the bearing 60 are accumulated due to the structure in which the bearing 60 is attached to the housing 70 and the output shaft (turret) 30, rotation precision of the output shaft 30 can thus not be maintained, and in a case in which required performance is not met, it is necessary to perform remachining and reassembling operations.

As one of methods for solving such a problem, Patent Literature 3 described above employs a method in which a crossed roller bearing configured of an outer raceway part, an inner raceway part, a plurality of rolling elements that roll there between, and a retainer holding these plurality of rolling elements is used as a bearing for holding a rotational axial body (turret) rotated by a cam mechanism, and a V-shaped groove for guiding the rolling elements is directly worked on the circumference of the rotational axial body along a rotation direction, thereby obtaining an inner raceway surface. However, since the inner raceway part and the outer raceway part of the crossed roller bearing are formed obliquely relative to the central axes of the rotational axial body and the outer ring at the rotational axial body and the outer ring, and a surface on which the rolling elements receive loads is obliquely guided, there is a problem that a reaction force in an oblique direction is generated in accordance with the inclination of the rolling elements and the rotational center of the output shaft is inclined if loads in an axial direction (a direction parallel to the central axis) and a radial direction (a direction vertical to the rotation central axis) are received during rotation of the cam device, and as a result, rotation precision is degraded. In addition, there is also a problem that the loads received by the rolling elements decrease as compared with a case in which contact surfaces of the rolling elements are vertical to load directions, and as a result, rigidity of the bearing is also relatively degraded.

Further, the relative degradation of the rigidity of the bearing is not only disadvantageous for loads received from the outside of the cam device but also disadvantageous for loads generated inside the cam device and variations in rotation torque. For example, there is a case in which variations in rotation torque of input and output shafts occur inside the cam device due to mechanical conflicts (theoretical errors) of the roller gear cam mechanism and variations in machining precision and assembling precision in the process of manufacturing components, these act on the bearing, and the rotational axial body (turret) is thus displaced. As a result, there were also problems that rotation quality of the cam device deteriorated and that rotation precision was degraded.

Solution to Problem

As means for comprehensively solving these problems, the present invention employs a structure in which raceway surfaces of two types for a radial bearing part and axial bearing parts are formed at an outer periphery of an outer shaft, further, an inner ring has a shape integrated with the outer shaft, and an insertion through-hole 85 for an inner ring attachment bolt 81, which has been provided in the vicinity of a radial raceway surface in the related art, is not provided.

A cam device according to the present invention is configured as follows.

There is provided a cam device including: a screw-shaped cam configured to serve as an input shaft; an output shaft (turret) provided with a roller follower at an outer periphery and arranged so as to perpendicularly intersect the input shaft; and a bearing configured to rotatably secure the output shaft to a housing, in which rotation of the input shaft is converted into rotation of the output shaft via the cam follower, the bearing includes one radial bearing part configured to receive a load in a radial direction of the output shaft and two axial bearing parts configured to receive opposing loads in an axial direction of the output shaft, each of the one radial bearing part and the two axial bearing parts is configured of a plurality of rolling elements and a retainer, a row of the rolling elements of the radial bearing part is in rotatable contact with an outer peripheral surface of the output shaft, the contact surface serves as an output-shaft side raceway surface of the radial bearing part, a row of the rolling elements of one of the two axial bearing parts is in rotatable contact with the outer peripheral surface of the outer shaft, a row of the rolling elements of the other one of the axial bearing parts is in rotatable contact with the outer peripheral surface of the output shaft or a surface of a first ring-shaped part secured to the output shaft, and the contact surfaces of these two rows form output-shaft side raceway surfaces of the axial bearing parts, rows of the rolling elements of the radial bearing part and one axial axis of the two axial bearing parts are in rotatable contact with a surface of a second ring-shaped part disposed in a periphery of the output shaft and secured to the housing or directly with an inner surface of the housing, these contact surfaces form an outer raceway surface of the radial bearing part and an outer raceway surface of the axial bearing part, and a row of the rolling elements of the other one of the axial bearing parts is in rotatable contact with a surface of the second ring-shaped part and forms another outer raceway surface of the axial bearing part, and the bearing is rotatably supported at the housing by the outer raceway surfaces.

Note that the first ring-shaped part may be secured to the outer periphery of the output shaft. Alternatively, the first ring-shaped part may have a same inner diameter as an inner diameter of the output shaft and form a part of the output shaft.

Each of the output-shaft side raceway surface and the outer raceway surface of the radial bearing part may be parallel to the axial direction, and each of the output-shaft side raceway surface and the outer raceway surface of the two axial bearing parts may be vertical to the axial direction.

Advantageous Effects of Invention

In this manner, it is possible to solve the problem that roundness of the output-shaft side raceway surface of the aforementioned inner ring is degraded due to a change into a polygonal shape in accordance with the number of bolt insertion through-holes during preloading or during application of a radial load, without enlarging the distance between the bolt and the output-shaft side raceway surface of the radial bearing part in the radial direction, and to prevent the aforementioned degradation of roundness. As a result, it is possible to provide a cam device with improved rotation precision of the output shaft.

It should be noted that the hatching lines in the figures are to identify the views as being cross-sectional views. No material properties should be inferred from the style of the hatching lines shown in the figures.

DESCRIPTION OF EMBODIMENTS

Embodiments for carrying out the present invention will be described below with reference to the drawings.

First Embodiment

Figure 2:
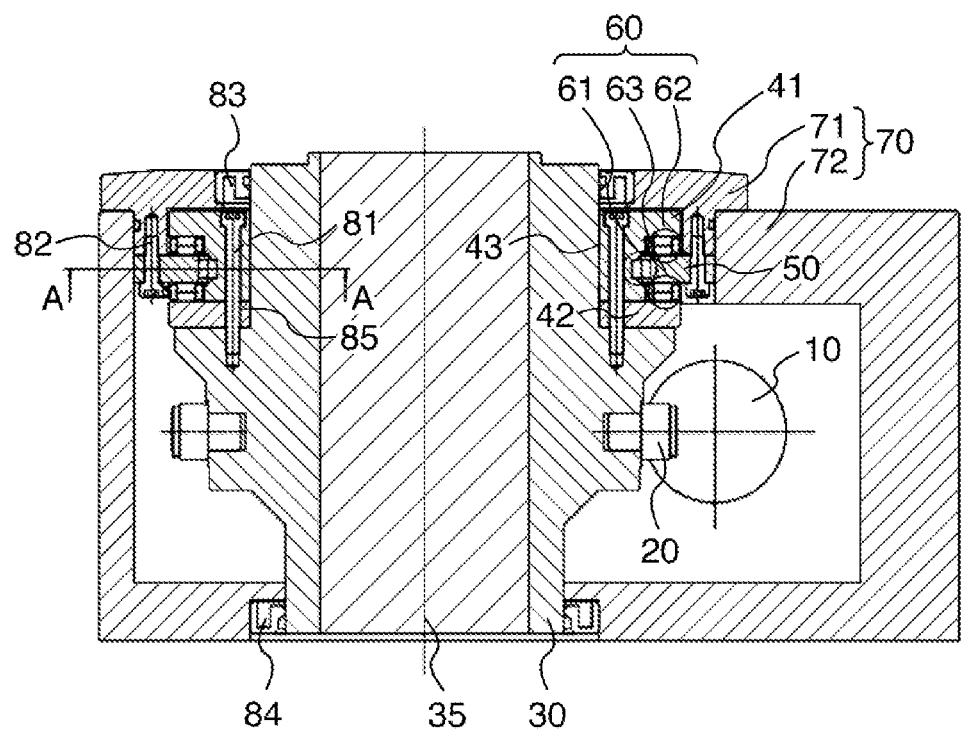
FIG. 2 is a sectional view of an example of a cam device in the related art.
Figure 4:
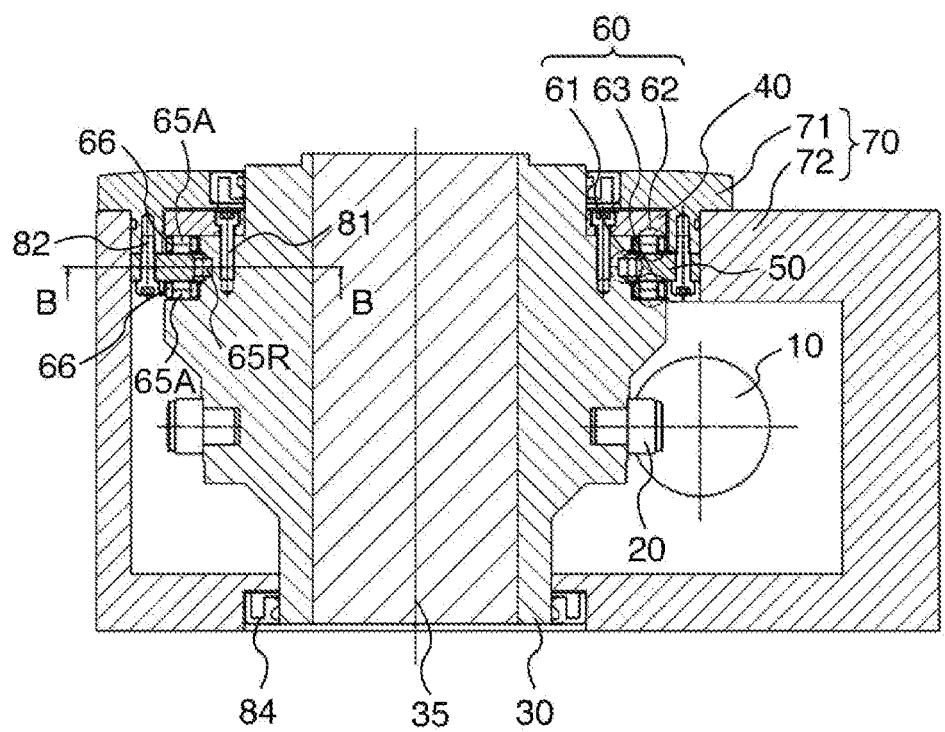
FIG. 4 is a sectional view of the cam device according to the first embodiment of the present invention.
Figure 5:
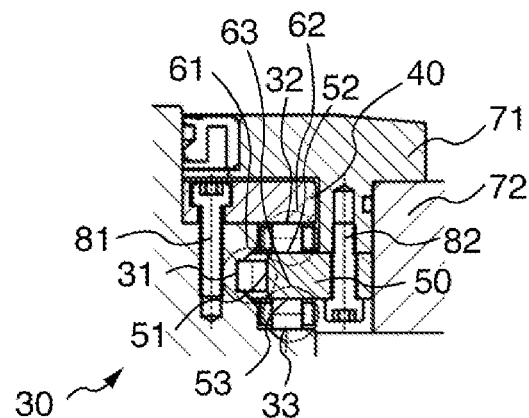
FIG. 5 is an enlarged sectional view of the vicinity of a bearing of the cam device according to the first embodiment of the present invention.

A sectional view of a cam device according to a first embodiment of the present invention is illustrated in FIG. 4. Similarly to the cam device in the related art in FIG. 2, a bearing 60 has a three-row structure as a combination of one radial bearing part 61 and two axial bearing parts 62 and 63, each of the radial bearing part 61 and the first and second axial bearing parts 62 and 63 has a configuration in which a plurality of rolling elements 65A, 65R are aligned in a ring shape using a retainer 66, and an output shaft (turret) 30 rotates by the rolling elements 65A, 65R rotating. An enlarged view of the vicinity of the bearing in FIG. 4 is illustrated in FIG. 5.

Figure 3:
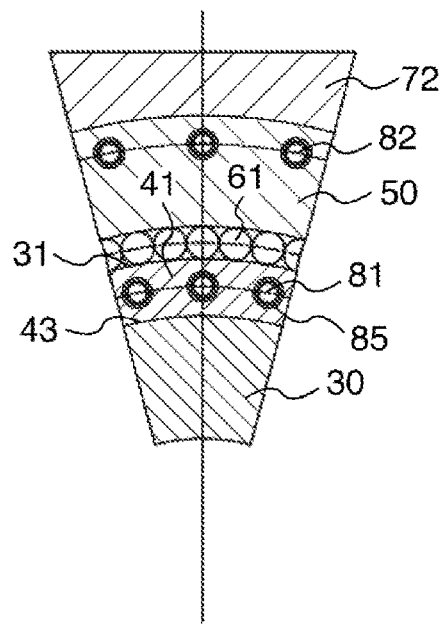
FIG. 3 is a sectional view of a section A-A of the cam device in the related art (A) and a sectional view of a section B-B of a cam device according to a first embodiment of the present invention (B).
Figure 3:
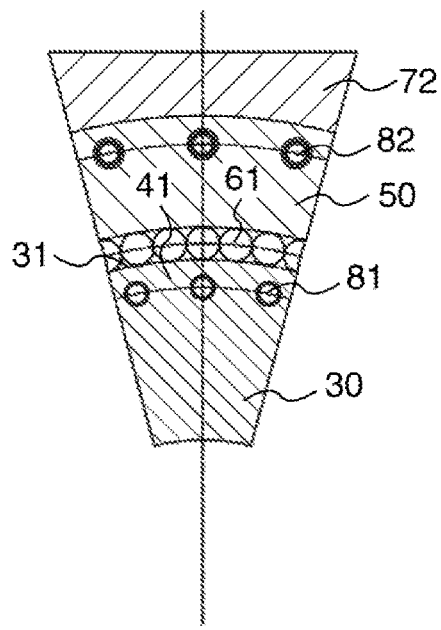

In the embodiment, an output-shaft side raceway surface 31 of the radial bearing part 61 and an output-shaft side raceway surface 33 of the second axial bearing part 63 are formed directly around the output shaft 30 such that the rolling elements thereof are in rotational contact with the output-shaft side raceway surfaces 31 and 33, respectively. The inner ring 41 and the bearing ring 42 of the axial bearing part in the cam device in the related art illustrated in FIG. 2 have configurations integrated with the output shaft (turret) 30 in the embodiment. On the other hand, an output-shaft side raceway surface 32 of the first axial bearing part 62 is formed on the surface of the first ring-shaped part (axial bearing ring) 40 secured to the output shaft 30 with a bolt 81. Also, an outer raceway surface 51 of the radial bearing part 61 and outer raceway surfaces 52 and 53 of the first and second axial bearing parts 62 and 63 are formed on the surface of the outer ring (second ring-shaper part) 50. The outer ring 50 is secured to the first housing 71 with a securing bolt 82. As illustrated in (B) of FIG. 3, although the securing bolt 81 is also located in the vicinity of the raceway surface 31 of the radial bearing part in this case, the thickness of the output shaft at the position of the bolt is not substantially different from the thickness of the other location since the bolt 81 and the output shaft 30 are in a fitted state. Thus, roundness of the raceway surface of the radial bearing part is not degraded during preloading.

Figure 6:
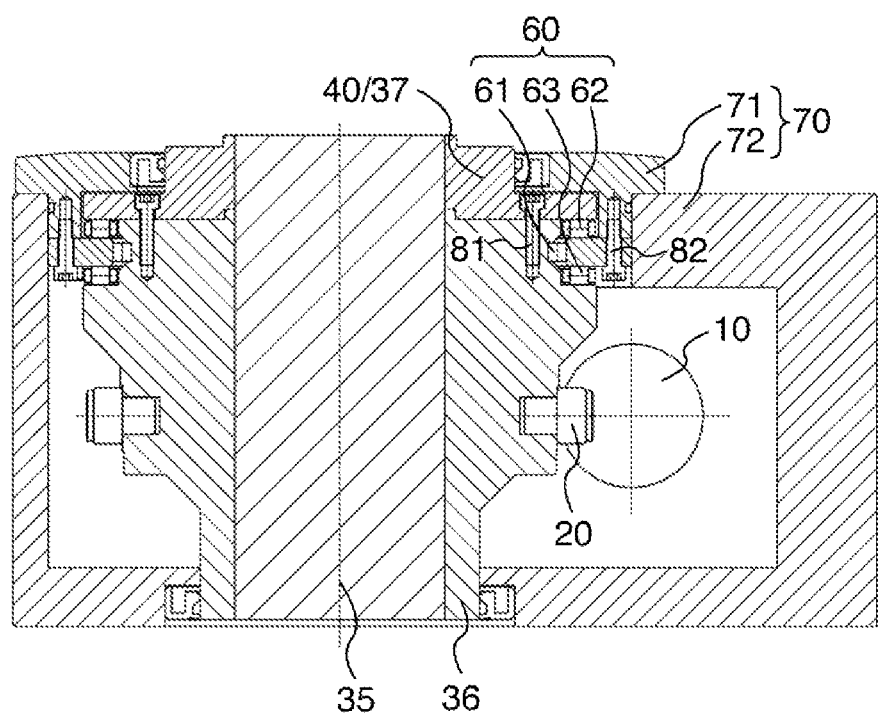
FIG. 6 is a sectional view of a cam device according to another aspect of the first embodiment of the present invention.

Another aspect of the first embodiment is illustrated in FIG. 6. A difference from the aforementioned embodiment is that the axial bearing ring 40 with which the outer-shaft side raceway surface 32 of the first axial bearing part 62 is brought into contact extends in a direction of a central axis 35, has a center hole with the same inner diameter as that of the output shaft 30, and forms a part (second output shaft 37) of the output shaft 30. In other words, the output shaft 30 is configured of a first output shaft 36 and the second output shaft 37, and both the first output shaft 36 and the second output shaft 37 are secured to each other with the bolt 81. With such a configuration, since the raceway surface 32 of the first axial bearing part 62 is formed directly on the output shaft (turret) 30, there is an advantage that deformation of the raceway surface due to preloading and a load in the axial direction is curbed and rigidity in the axial direction is enhanced.

Figure 7:
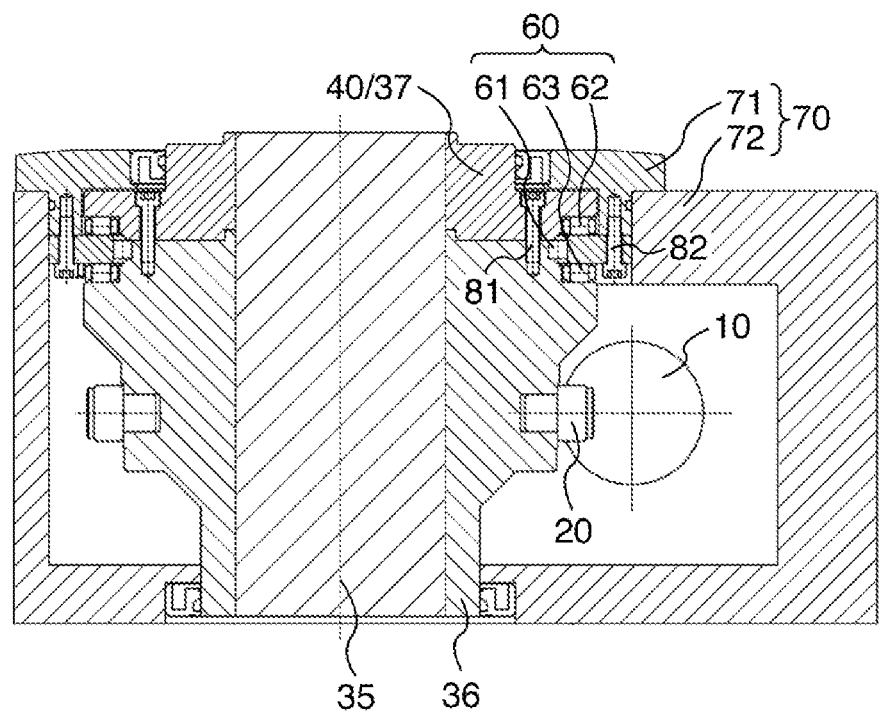
FIG. 7 is a sectional view of a cam device according to still another aspect of the first embodiment of the present invention.

Still another aspect of the first embodiment is illustrated in FIG. 7. Although a difference from the embodiment in FIG. 6 is that the thickness of the second output shaft 37 in the axial direction is increased such that a boundary surface with the first output shaft 36 reaches an upper end of the radial bearing part 61, there are substantially no differences in performance such as rigidity. This can be selected in terms of easiness in machining, measurement, and assembly of the bearing part.

Second Embodiment

Figure 8:
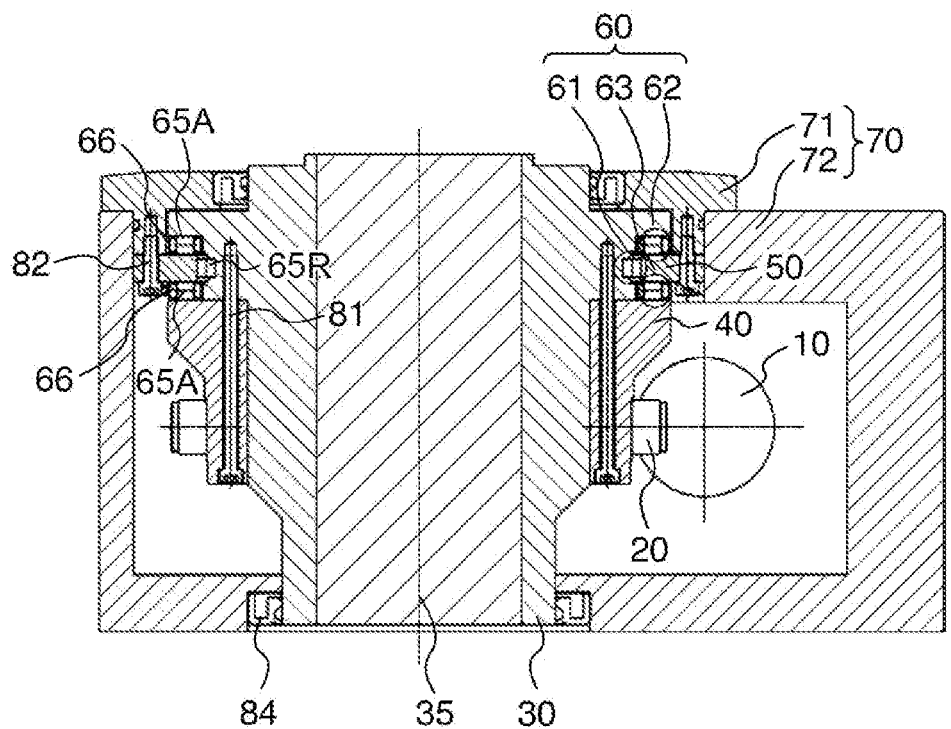
FIG. 8 is a sectional view of a cam device according to a second embodiment of the present invention.

A second embodiment of the present invention is illustrated in FIG. 8. In the embodiment, the inner ring 41 of the cam device in the related art in FIG. 2 has a configuration integrated with the output shaft (turret) 30. The raceway surface 31 of the rolling elements of the radial bearing part and the raceway surface 32 of the rolling elements of the first axial bearing part 62 are formed directly on the output shaft 30 as output-shaft side raceway surfaces while the output-shaft side axial raceway surface 33 of the second axial bearing part 63 is formed on the surface of the axial bearing ring 40 with which the roller follower 20 is assembled, which is formed so as to be vertical to the rotational axis 35. The axial bearing ring 40 is secured to the output shaft 30 with the bolt 81. Also, the outer raceway surface 51 of the radial bearing part 61 and the outer raceway surfaces 52 and 53 of the first and second axial bearing parts 62 and 63 are formed on surfaces in three directions of the outer ring (second ring-shaped part) 50 secured to the first housing 71 with the securing bolt 82 similarly to the first embodiment. Although the securing bolt 81 is also located in the vicinity of the output-shaft side raceway surface 31 of the radial bearing part 61 in this case similarly to the first embodiment, the bolt 81 and the output shaft 30 are in a fitted state, and the thickness of the output shaft at the position of the bolt is not substantially different from that at the other location.

Third Embodiment

Figure 9:
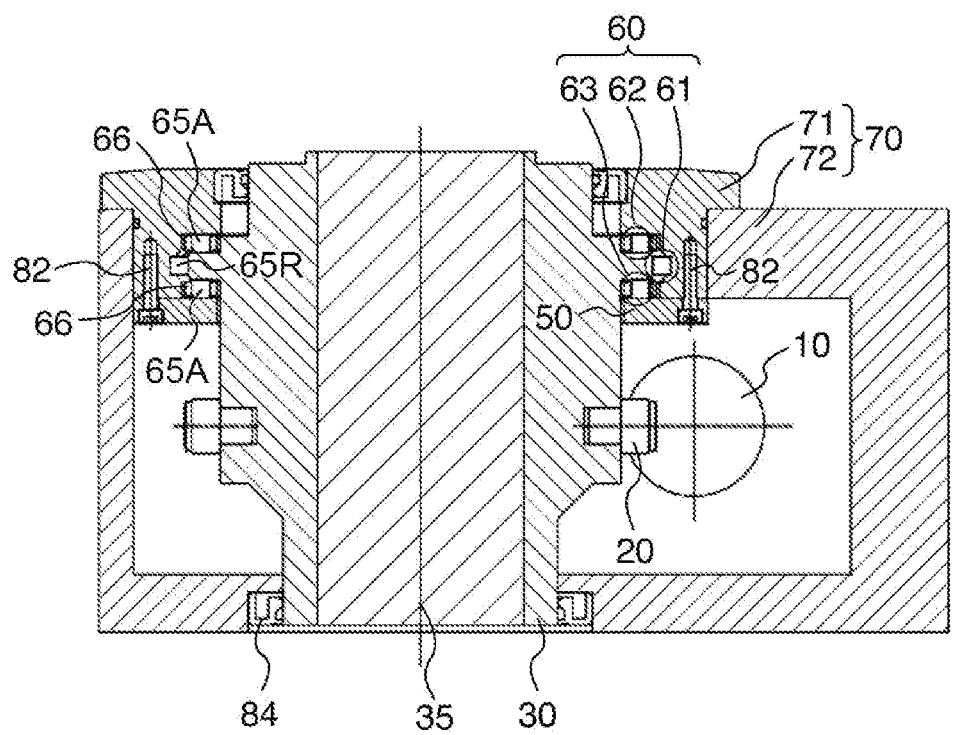
FIG. 9 is a sectional view of a cam device according to a third embodiment of the present invention.
Figure 10:
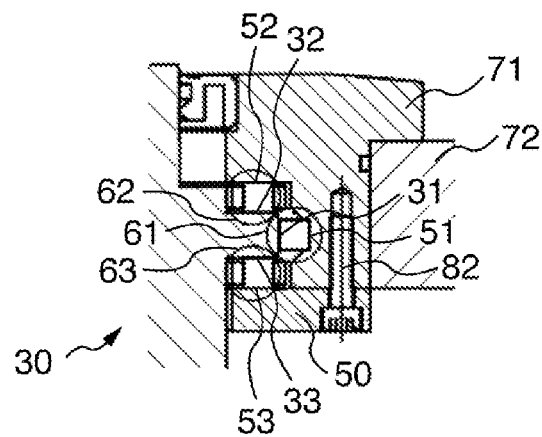
FIG. 10 is an enlarged sectional view of the vicinity of a bearing of the cam device according to the third embodiment of the present invention.
Figure 11:
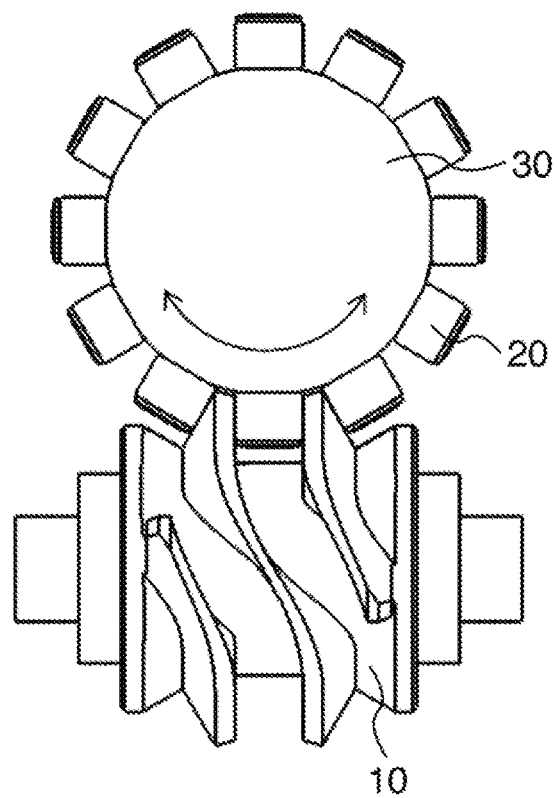
FIG. 11 is a schematic view illustrating a structure of another aspect of the roller gear cam mechanism.
Figure 12:
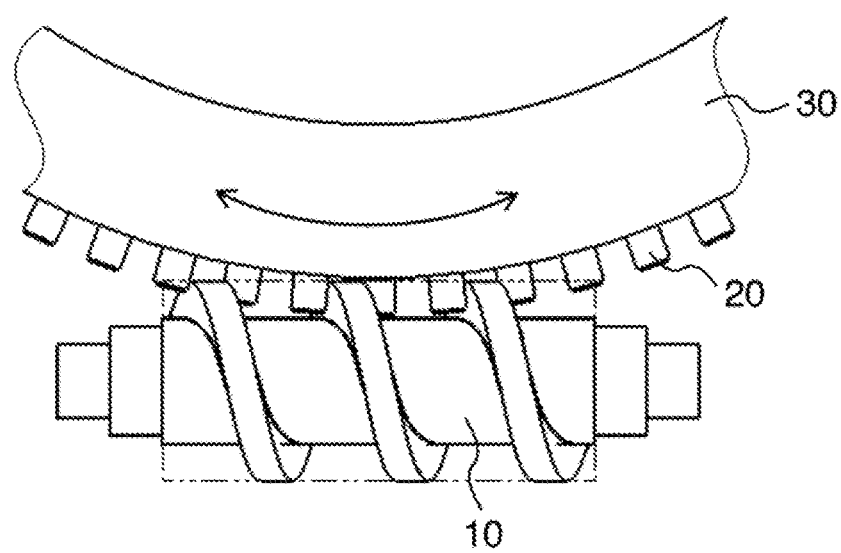
FIG. 12 is a schematic view illustrating a structure of still another aspect of the roller gear cam mechanism.
Figure 13:
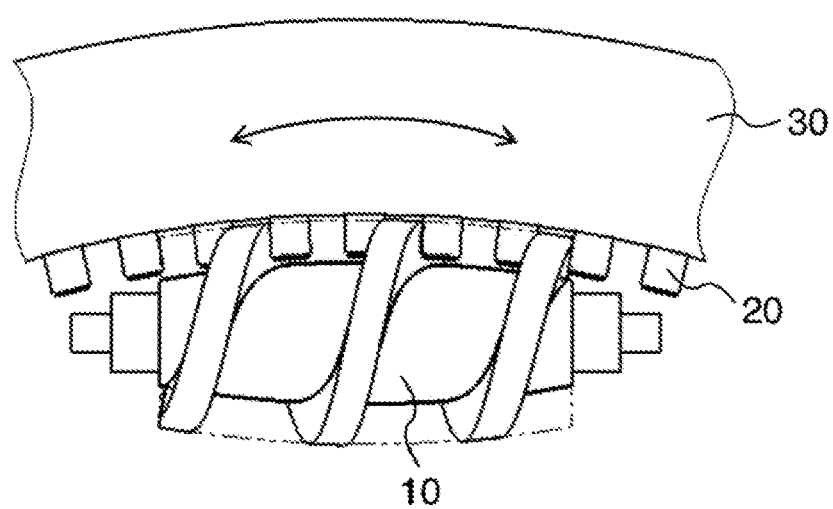
FIG. 13 is a schematic view illustrating a structure of yet another aspect of the roller gear cam mechanism.
Figure 14:
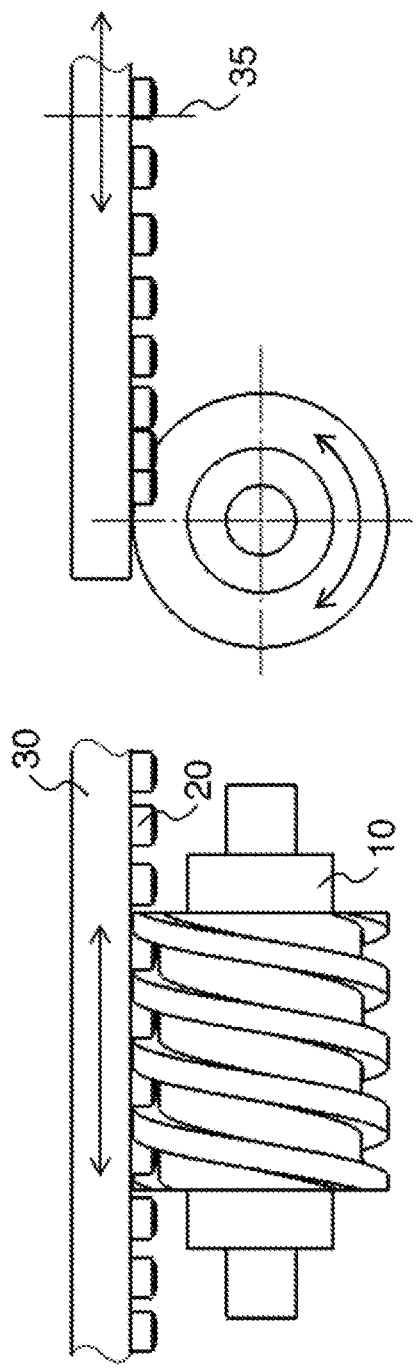
FIG. 14 is a schematic view illustrating a structure of yet another aspect of the roller gear cam mechanism and illustrates a case in which a rotational axis of a roller follower is parallel to an output shaft.

A third embodiment of the present invention is illustrated in FIG. 9. Also, an enlarged view of the vicinity of the bearing is illustrated in FIG. 10. All of the outer raceway surface 51 of the radial bearing part 61 and the outer raceway surfaces 52 and 53 of the first and second axial bearing parts 62 and 63 have structures in contact with the outer ring 50 (second ring-shaped part) in the related art and the first and second embodiments, while all of the output-shaft side raceway surface 31 of the radial bearing part 61 and the output-shaft side raceway surfaces 32 and 33 of the first and second axial bearing parts have structures in contact with an outer peripheral surface formed directly on the output shaft 30 in this embodiment. On the other hand, the outer raceway surface 51 of the radial bearing part 61 and the outer raceway surface 52 of the first axial bearing part 62 are formed on a surface inside the first housing 71, and the outer raceway surface 53 of the second axial bearing part 63 is formed on the surface of the outer ring (second ring-shaped part) 50. The outer ring 50 is secured to the first housing 71 with the bolt 82. Although the securing bolt 82 in this case is located in the vicinity of the outer raceway surface 51 of the radial bearing part 61, the bolt 82 and the housing 71 are in a fitted state, and thus, there are substantially no differences between the thickness of the housing 71 at the position of the bolt and the thickness at the other location. Thus, the roundness of the raceway surface of the radial bearing part is not degraded during preloading. Also, since the radial bearing part 61 and the first and second axial bearing parts 62 and 63 can be assembled regardless of the structure in which the axial raceway surface 40 and the output shaft 30 are formed into an integral shape as in the second embodiment (FIG. 8), it is not necessary to prepare the bolt 81 for securing the axial bearing part, which is needed in the first and second embodiments, and there is an advantage that the number of assembling processes can be reduced in this embodiment.

Note that although the above description has been made in regard to the embodiments, it would be obvious for those skilled in the art that the present invention is not limited thereto and various changes and modifications can be made within a spirit of the present invention and a scope of the accompanying claims. For example, although the example in which the output-shaft side and outer raceway surfaces of the radial bearing part are parallel to the axial direction and the output-shaft side and outer raceway surfaces of the two axial bearing parts are vertical to the axial direction has been illustrated, it is obvious that angles of these may be inclined angles as needed.

Figure 1:
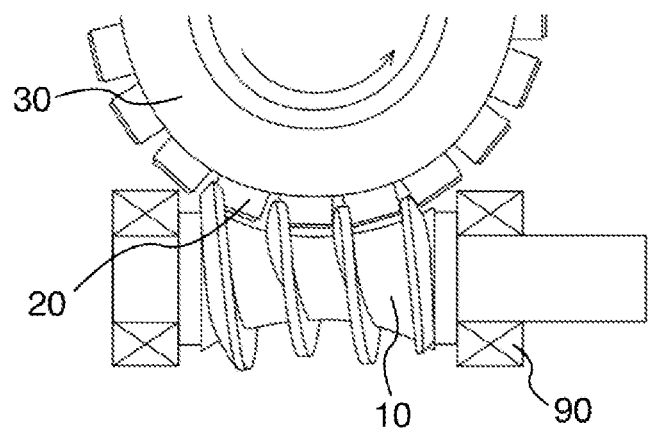
FIG. 1 is a schematic view illustrating a structure of a roller gear cam mechanism.

Also, it is obvious that as illustrated in FIGS. 11 to 14, the roller gear cam mechanism to which the present invention can be applied is not limited to the aspect illustrated in FIG. 1 and the present invention can also be applied to a configuration with different shapes of cam 10 and output shaft 30 and different contact directions and contact states of roller follower 20 from those in FIG. 1.

The invention claimed is:

1. A cam device comprising:
   a screw-shaped cam configured to serve as an input shaft;
   an output shaft provided with a roller follower at an outer peripheral surface of the output shaft and arranged so as to perpendicularly intersect the input shaft; and
   a bearing configured to rotatably secure the output shaft to a housing,
   wherein rotation of the input shaft is converted into rotation of the output shaft via the roller follower,
   the bearing includes one radial bearing part configured to receive a pressure in a radial direction of the output shaft and two axial bearing parts configured to receive opposing pressures in an axial direction of the output shaft,
   each of the one radial bearing part and the two axial bearing parts is configured of a plurality of rolling elements and a retainer,
   a ring of the rolling elements of the radial bearing part is in direct contact with the outer peripheral surface of the output shaft, this contact surface serves as an output-shaft side raceway surface of the radial bearing part,
   a ring of the rolling elements of one of the two axial bearing parts is in direct contact with the outer peripheral surface of the output shaft, a ring of the rolling elements of the other one of the axial bearing parts is in direct contact with the outer peripheral surface of the output shaft or a first surface of a first ring-shaped part secured to the output shaft, and contact surfaces of the rolling elements of the axial bearing parts form output-shaft side raceway surfaces of the axial bearing parts,
   the rings of the rolling elements of the radial bearing part and the rolling elements of one of the two axial bearing parts are in contact with a second surface of a second ring-shaped part disposed about the output shaft to form an outer raceway surface of the radial bearing part and an outer raceway surface of the axial bearing part respectively, the rings of the rolling elements of the radial bearing part and the rings of the rolling elements of one of the two axial bearing parts are secured to the housing or are directly with an inner surface of the housing, and the rings of the rolling elements of the other one of the axial bearing parts are in contact with the second ring-shaped part and form another outer raceway surface of the axial bearing part, and
   the bearing is rotatably supported at the housing by the output-shaft side raceway surface of the radial bearing part and the output-shaft side raceway surfaces of the axial bearing parts.

2. The cam device according to claim 1, wherein the first ring-shaped part is secured to the outer peripheral surface of the output shaft.

3. The cam device according to claim 1, wherein the first ring-shaped part has a same inner diameter as an inner diameter of the output shaft and forms a part of the output shaft.

4. The cam device according to claim 1,
   wherein each of the output-shaft side raceway surface and the outer raceway surface of the radial bearing part is parallel to the axial direction, and
   each of the output-shaft side raceway surface and the outer raceway surface of the two axial bearing parts is perpendicular to the axial direction.

* * * * *